United States Patent Office 3,574,729
Patented Apr. 13, 1971

3,574,729
PRODUCTION OF UNSATURATED ALIPHATIC ACIDS
Edward James Gasson, Kingswood, England, assignor to The Distillers Company Limited, Edinburgh, Scotland
No Drawing. Filed Oct. 25, 1966, Ser. No. 589,245
Claims priority, application Great Britain, Nov. 10, 1965, 47,796/65
Int. Cl. C07c 57/04
U.S. Cl. 260—530
10 Claims

ABSTRACT OF THE DISCLOSURE

The production of acrylic and methacrylic acid by reacting acrolein and methacrolein, respectively, with oxygen at elevated temperatures in the presence of a primary oxide composition of antimony, molybdenum and vanadium with an additional oxide of an element of the group consisting of tin, nickel, chromium and titanium, said composition less molybdenum, having been heated in the presence of oxygen at 700 to 900° C. followed by the addition of molybdenum and heating at 500 to 900° C. in the presence of oxygen.

---

The present invention relates to the production of unsaturated aliphatic acids and particularly to the production of acrylic and methacrylic acids.

British patent specification No. 903,034 describes and claims a process for the production of acrylic acid or methacrylic acid which comprises reacting at an elevated temperature in the vapour phase acrolein or methacrolein, or a compound which gives rise to acrolein or methacrolein under the reaction conditions, with molecular oxygen over an oxidation catalyst comprising (i) a mixture of the oxides of molybdenum and of a polyvalent metal or metals other than cobalt and/or (ii) a compound of molybdenum, oxygen and a polyvalent metal or metals other than cobalt. Suitable polyvalent metals described and claimed are vanadium, iron, cerium, titanium, nickel, tungsten, bismuth, tin or antimony or mixtures thereof.

It has now been found that catalysts containing particular combinations of the above polyvalent metals especially when subjected to a particular form of heat treatment have enhanced catalytic effect on the process.

Accordingly the present invention is a process for the production of acrylic or methacrylic acid which comprises reacting at an elevated temperature in the vapour phase acrolein or methacrolein with molecular oxygen over an oxide composition containing antimony, molybdenum and vanadium together with one or more of the metals, tin, nickel, chromium or titanium as catalyst.

The oxide composition catalysts may be regarded either as mixtures of metal oxides or as oxygen-containing compounds of the metals; under the reaction conditions the catalyst may contain either or both forms.

The catalyst may be prepared in various ways, for instance by precipitation from a mixed aqueous solution of the soluble salts of the metals by the addition of, for example, ammonia or from the oxides, carbonates, hydroxides or hydrate oxides by suitable admixture followed if necessary by thermal decomposition of compounds such as carbonates, hydroxides or hydrated oxides to produce the corresponding oxides in situ.

By whichever methods the catalyst is prepared it is preferred to prepare a primary composition containing all the components except the molybdenum and to heat this composition in a molecular oxygen containing gas, e.g., air at a temperature within the range 700° to 900° C. and then to add the molybdenum component and to heat the final composition in a molecular oxygen containing gas, e.g., air at a temperature within the range 500° to 900° C.

The molybdenum component may be added to the primary composition in the form of the oxide or a heat decomposable compound, e.g., ammonium molybdate or molybdic acid. It is preferred to add the molybdenum component as an aqueous solution of a soluble compound, e.g., ammonium molybdate to the oxide composition of the other components and then to evaporate the mixture to dryness.

The proportions of the various components of the oxide composition catalyst may vary within moderately wide limits. Preferably the composition contains antimony, vanadium, molybdenum and the additional metal components in the range of atomic ratios, antimony, to vanadium of 2:1 to 5:1, antimony to molybdenum of 1:1 to 1:5 and of antimony to additional metal of 2:1 to 16:1.

The oxide composition catalysts may if desired, be deposited upon supports such as alumina, pumice, silica or titania.

The reaction of acrolein or methacrolein, propylene or isobutylene with molecular oxygen over the oxide composition catalysts may be carried out in any suitable manner, for instance, as a fixed bed process in which the catalyst is used in the form of granules or pellets, or a single or multistage fluidised bed process, or as a moving bed process.

The proportion of acrolein or methacrolein, propylene or isobutene in the feed to the reaction may vary within fairly wide limits, for example between 1 and 20% by volume in the feed, and suitably between 2 and 10% by volume.

The proportion of oxygen in the feed may also vary within moderately wide limits, for example between 1 and 20% by volume and preferably between 2 and 15% by volume. The oxygen may be diluted with inert gases, and may be, for example, supplied as air.

It is preferred to carry out the reaction in the presence of a gas which is substantially inert under the conditions of reaction, for example, nitrogen, propane, butane, isobutane, carbon dioxide and/or steam. It is preferred to use stem or nitrogen or mixtures thereof. The concentration of the steam may vary within wide limits, for example, between 10 and 60% by volume of the feed.

The reaction is carried out at an elevated temperature, for instance between 250° and 550° C., preferably between 300 and 500° C. The reaction may also be carried out under pressure for example pressures of from 0.5 to 5 atmospheres absolute.

The contact time may be, for example, in the range ½ to 30 seconds and preferably between 1 and 5 seconds.

The acrylic acid or methacrylic acid may be recovered from the reaction product by any conventional method, for example, by condensation or extraction with water.

The process of the invention is further illustrated by the following examples.

EXAMPLE 1

Commercial antimony trioxide (145.5 parts by weight) was suspended in a solution of nickel nitrate hexahydrate (145.4 parts by weight) in water (2000 parts by weight) at 60° C. and the mixture was brought to pH 7.5 by the addition of aqueous ammonia. The mixture was filtered and the solid washed once by resuspension for 15 minutes in water (1000 parts by weight) and filtered. The cake was mixed with water (500 parts by weight) and commercial vanadium pentoxide (31.8 parts by weight) for one hour, filtered and dried at 110° C. for 16 hours. The cake was broken down to pass 30 mesh (B.S.S.), mixed with graphite (1% by weight) pelleted and heated in air in a muffle furnace. The furnace temperature was programmed from 200° to 800° C. at 22°/hour and maintained at 800° C. for 16 hours. The pellets were broken down to pass 30 mesh (B.S.S.) and mixed with water (400 parts by weight) and ammonium molybdate, $$(NH_4)_6Mo_7O_{24}:4H_2O$$

(123.6 parts by weight) at 60° C. The slurry was evaporated to a thick paste on a steam bath and dried at 110° C. for 16 hours. The cake was broken down to pass 30 mesh (B.S.S.), mixed with graphite (1% by weight), pelleted and heated in air in a muffle furnace. The furnace temperature was programmed from 200 to 600° C. at 22°/hour and maintained at 600° C. for 16 hours.

A gaseous mixture of 7% by volume of acrolein, 5% by volume of oxygen, 58% by volume of nitrogen and 30% by volume of steam was passed over the catalyst in a reactor maintained at 385° C., the contact time being 3 seconds.

Of the total acrolein fed to the reactor, 64% was converted to acrylic acid, 18% to carbon oxides and 13% was recovered unchanged.

EXAMPLE 2

Commercial antimony trioxide (145.5 parts by weight) was suspended in a solution of chromium nitrate nonahydrate (200.1 parts by weight) in water (2000 parts by weight) at 60° C. and the mixture brought to pH 7.4 by the addition of aqueous ammonia. The mixture was filtered and the solid washed once by resuspension for 15 minutes in water (1000 parts by weight) and filtered. The cake was mixed with water (500 parts by weight) and commercial vanadium pentoxide (31.8 parts by weight) for one hour, filtered and dried at 110° C. for 16 hours. The cake was broken down to pass 30 mesh (B.S.S.), mixed with graphite (1% by weight), pelleted and heated in air in a muffle furnace. The furnace temperature was programmed from 200° C. to 800° C. at 22°/hour and maintained at 800° C. for 16 hours. The pellets were broken down to pass 30 mesh (B.S.S.) and mixed with water (400 parts by weight) and ammonium molybdate, $$(NH_4)_6Mo_7O_{24}:4H_2O$$

(123.6 parts by weight) at 60° C. The slurry was evaporated to a thick paste on a steam-bath and dried at 110° C. for 16 hours. The cake was broken down to pass 30 mesh (B.S.S.), mixed with graphite (1% by weight), pelleted and heated in air in a muffle furnace. The furnace temperature was programmed from 200° C. to 600° C. at 22°/hour and maintained at 600° C. for 16 hours.

A gaseous mixture of 7% by volume of acrolein, 5% by volume of oxygen, 58% by volume of nitrogen and 30% by volume of steam was passed over the catalyst in a reactor maintained at 382° C., the contact time being 3 seconds.

Of the total acrolein fed to the reactor, 55% was converted to acrylic acid, 14% to carbon oxides and 25% was recovered unchanged.

EXAMPLE 3

Commercial antimony trioxide (145.5 parts by weight) was suspended in a solution of titanium tetrachloride (94.9 parts by weight) in hydrochloric acid (236 parts by weight, S.G. 1.18) and distilled water (1800 parts by weight) and the mixture brought to pH 8 by the addition of aqueous ammonia. The mixture was filtered and the solid washed twice by resuspension for 15 minutes in water (1000 parts by weight) and filtered. The cake was mixed with water (500 parts by weight) and commercial vanadium pentoxide (31.8 parts by weight) for one hour, filtered and dried at 110° C. for 16 hours. The cake was broken down to pass 30 mesh (B.S.S.) mixed with graphite (1% by weight), pelleted and heated in air in a muffle furnace. The furnace temperature was programmed from 200° C. to 750° C. at 22°/hour and maintained at 750° C. for 16 hours. The pellets were broken down to pass 30 mesh (B.S.S.) and mixed with water (400 parts by weight) and ammonium molybdate, $(NH_4)_6Mo_7O_{24}, 4H_2O$ (123.6 parts by weight) at 60° C. The slurry was evaporated to a thick paste on a steam bath and dried at 110° C. for 16 hours. The cake was broken down to pass 30 mesh (B.S.S.), mixed with graphite (1% by weight), pelleted and heated in air in a muffle furnace. The furnace temperature was programmed from 200° C. to 600° C. at 22°/hour and maintained at 600° C. for 16 hours.

A gaseous mixture of 7% by volume of acrolein, 5% by volume of oxygen, 58% by volume of nitrogen and 30% by volume of steam was passed over the catalyst in a reactor maintained at 380° C., the contact time being 3 seconds.

Of the total acrolein fed to the reactor, 38% was converted to acrylic acid, 4% to carbon oxides and 52% was recovered unchanged.

EXAMPLE 4

Powdered tin (118 parts by weight) was added during 20 minutes to a stirred suspension of commercial antimony trioxide (291.5 parts by weight) in a mixture of nitric acid (710 parts by weight, S.G. 1.42) and water (2000 parts by weight) at 95 to 100° C.; the mixture stirred for 10 minutes, cooled to 40° C. and filtered. The solid was washed twice by resuspension for 15 minutes in water (2000 parts by weight) and filtered. The cake was mixed with water (750 parts by weight), commercial vanadium pentoxide (63.6 parts by weight) and ammonium molybdate, $$(NH_4)_6Mo_7O_{24}4H_2O$$

(248 parts by weight) for one hour, evaporated to a thick paste on a steam bath and dried at 110° C. for 16 hours.

The cake was broken down to pass 30 mesh (B.S.S.) mixed with graphite (1% by weight), pelleted and heated in air in a muffle furnace. The furnace temperature was programmed from 200° C. to 800° C. at 22°/hour and maintained at 800° C. for 16 hours.

A gaseous mixture of 7% by volume of acrolein, 5% by volume of oxygen, 58% by volume of nitrogen and 30% by volume of steam was passed over the catalyst in a reactor maintained at 381° C., the contact time being 3 seconds.

Of the total acrolein fed to the reactor, 61% was converted to acrylic acid, 9% to carbon oxides and 23% was recovered unchanged.

I claim:
1. A process for the production of an unsaturated aliphatic carboxylic acid selected from the group consisting of acrylic or methacrylic acid which comprises reacting at an elevated temperature an unsaturated aliphatic aldehyde selected from the group consisting of acrolein for the production of acrylic acid or methacrolein for the production of methacrylic acid with molecular oxygen over an oxide composition consisting essentially of antimony, molybdenum, vanadium, and oxygen together with an additional element selected from the group consisting of tin, nickel, chromium, and titanium as catalyst, said oxide composition having been produced by forming a primary composition containing all the componets except molybdenum, heating the primary composition in a molecular oxygen containing gas at a temperature within the range 700 to 900° C., adding the molybdenum component and heating the resulting composition in a molecular oxygen containing gas and at a temperature within the range 500 to 900° C.

2. A process as claimed in claim 1 wherein the molybdenum component is added in the form of a material selected from the group consisting of the oxide or a heat decomposable compound.

3. A process as claimed in claim 2 wherein the heat decomposable compound is selected from the group consisting of ammonium molybdate or molybdic acid.

4. A process as claimed in claim 3 wherein the molybdenum component is added in the form of an aqueous solution of ammonium molybdate and the resulting composition evaporated to dryness.

5. A process as claimed in claim 1 wherein the oxide composition contains the metal components in the range of atomic ratios antimony to vanadium of 2:1 to 5:1; antimony to molybdenum of 1:1 to 1:5 and of antimony to additional metal of 2:1 to 16:1.

6. A process as claimed in claim 1 wherein the oxide composition is deposited on a support.

7. A process as claimed in claim 6 wherein the support is selected from the group consisting of alumina, pumice, silica or titania.

8. A process as claimed in claim 1 carried out at a temperature between 250 and 550° C.

9. A process as claimed in claim 8 carried out at a temperature between 300 and 500° C.

10. A process as claimed in claim 1 carried out under pressures in the range of 0.5 to 5 atmospheres absolute.

References Cited

UNITED STATES PATENTS

| 3,409,665 | 11/1968 | Brown et al. | 260—530U |
| 3,405,172 | 10/1968 | Brown et al. | 260—530U |
| 3,408,392 | 10/1968 | Yamagishi et al. | 260—530U |

FOREIGN PATENTS

| 501,294 | 8/1965 | Netherlands | 260—530U |
| 903,034 | 8/1962 | Great Britain | 260—530U |

JAMES A. PATTEN, Primary Examiner

U.S. Cl. X.R.

252—456, 458, 459, 467, 469, 470